United States Patent
Khalid et al.

(10) Patent No.: US 10,135,805 B2
(45) Date of Patent: Nov. 20, 2018

(54) CONNECTED AUTHENTICATION DEVICE USING MOBILE SINGLE SIGN ON CREDENTIALS

(71) Applicant: CELLCO PARTNERSHIP, Basking Ridge, NJ (US)

(72) Inventors: Mohammad Raheel Khalid, Budd Lake, NJ (US); Ji Hoon Kim, Lyndhurst, NJ (US); Cory Michael Bruno, South River, NJ (US); Paul Berman, Roselle Park, NJ (US); Mauricio Pati Caldeira De Andrada, South Plainfield, NJ (US); Samir Vaidya, Highland Park, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 194 days.

(21) Appl. No.: 14/069,310

(22) Filed: Oct. 31, 2013

(65) Prior Publication Data

US 2015/0121501 A1  Apr. 30, 2015

(51) Int. Cl.

| G06F 7/04 | (2006.01) |
|---|---|
| G06F 15/16 | (2006.01) |
| G06F 17/30 | (2006.01) |
| H04L 29/06 | (2006.01) |
| H04W 12/06 | (2009.01) |

(52) U.S. Cl.
CPC ...... *H04L 63/0815* (2013.01); *H04L 63/0853* (2013.01); *H04W 12/06* (2013.01); *H04L 63/08* (2013.01); *H04L 63/107* (2013.01)

(58) Field of Classification Search
CPC ............ H04L 63/0815; H04L 63/0853; H04L 63/107; H04L 63/08; G06F 21/41; G06F 21/34–21/35; G06F 21/31; H04W 12/08; H04W 12/06
USPC ...................................... 726/2, 5–10, 26–30
See application file for complete search history.

(56) References Cited

U.S. PATENT DOCUMENTS

| 6,459,988 B1 | 10/2002 | Fan et al. |
|---|---|---|
| 6,490,443 B1 | 12/2002 | Freeny |
| 6,496,855 B1 | 12/2002 | Hunt et al. |
| 6,594,765 B2 | 7/2003 | Sherman et al. |
| 6,607,136 B1 | 8/2003 | Atsmon et al. |
| 6,708,171 B1 | 3/2004 | Waldo et al. |
| 6,732,278 B2 | 5/2004 | Baird et al. |
| 7,076,797 B2 | 7/2006 | Loveland |
| 7,275,685 B2 | 10/2007 | Gray et al. |
| 7,430,537 B2 | 9/2008 | Templeton et al. |
| 7,610,616 B2 | 10/2009 | Masuouka et al. |
| 7,672,644 B2 | 3/2010 | Sun et al. |
| 7,685,629 B1 | 3/2010 | White et al. |
| 7,860,488 B2 | 12/2010 | Wollersheim et al. |
| 8,005,075 B1 | 8/2011 | Webster et al. |
| 8,059,542 B1 | 11/2011 | Oroskar et al. |

(Continued)

*Primary Examiner* — Trong H Nguyen

(57) ABSTRACT

Systems and methods for device-based authentication are disclosed. In some implementations, a device receives a Single Sign On PIN from a backend server. The device transmits, to a token server, the Single Sign On PIN and credentials of a subscriber identity module (SIM) to request a token for accessing a network resource via a computer different from the device. The token is associated with a user account. The device receives the token from the token server. The device stores the token at a local memory of the device.

18 Claims, 6 Drawing Sheets

(56) References Cited

U.S. PATENT DOCUMENTS

| | | | |
|---|---|---|---|
| 8,442,526 B1 | 5/2013 | Bertz et al. | |
| 8,443,425 B1 * | 5/2013 | Evans | G06F 21/31 726/26 |
| 8,646,060 B1 * | 2/2014 | Ben Ayed | H04L 63/0853 726/9 |
| 8,649,768 B1 | 2/2014 | Gaddam et al. | |
| 8,995,992 B1 | 3/2015 | Cohen | |
| 9,112,883 B2 | 8/2015 | Abbott et al. | |
| 9,246,918 B2 | 1/2016 | Marshall et al. | |
| 9,325,687 B2 | 4/2016 | Caldeira De Andrada et al. | |
| 2002/0145043 A1 * | 10/2002 | Challa | G06K 7/10 235/462.01 |
| 2003/0084171 A1 * | 5/2003 | de Jong | G06F 21/33 709/229 |
| 2003/0220765 A1 * | 11/2003 | Overy | H04L 63/0492 702/158 |
| 2005/0105734 A1 * | 5/2005 | Buer | G07C 9/00007 380/270 |
| 2007/0136573 A1 | 6/2007 | Steinberg | |
| 2008/0022375 A1 | 1/2008 | Stanley | |
| 2008/0262928 A1 * | 10/2008 | Michaelis | G06Q 30/02 705/14.26 |
| 2008/0295159 A1 * | 11/2008 | Sentinelli | G06F 21/34 726/6 |
| 2009/0037732 A1 | 2/2009 | Boccon-Gibod et al. | |
| 2009/0132813 A1 | 5/2009 | Schibuk | |
| 2009/0247186 A1 | 10/2009 | Ji et al. | |
| 2009/0265775 A1 | 10/2009 | Wisely et al. | |
| 2009/0271850 A1 * | 10/2009 | Hoppe | G06F 21/31 726/6 |
| 2010/0022254 A1 | 1/2010 | Ashfield et al. | |
| 2010/0035590 A1 | 2/2010 | Martin | |
| 2011/0111737 A1 | 5/2011 | Abbott et al. | |
| 2011/0258689 A1 | 10/2011 | Cohen et al. | |
| 2011/0271331 A1 * | 11/2011 | Adams | H04L 63/0853 726/6 |
| 2012/0185166 A1 | 7/2012 | Chiang et al. | |
| 2012/0196566 A1 | 8/2012 | Lee et al. | |
| 2012/0302163 A1 | 11/2012 | Kitchen | |
| 2013/0103478 A1 | 4/2013 | Fisher | |
| 2013/0111208 A1 | 5/2013 | Sabin et al. | |
| 2013/0205380 A1 * | 8/2013 | Avni | H04L 63/0853 726/7 |
| 2013/0227668 A1 | 8/2013 | Mocanu | |
| 2013/0262311 A1 | 10/2013 | Buhrmann et al. | |
| 2014/0045454 A1 * | 2/2014 | Monjas Llorente | H04L 63/0853 455/406 |
| 2014/0049636 A1 | 2/2014 | O'Donnell et al. | |
| 2014/0096215 A1 | 4/2014 | Hessler | |
| 2014/0171024 A1 | 6/2014 | Huang et al. | |
| 2014/0177481 A1 | 6/2014 | Gaviria et al. | |
| 2014/0201517 A1 * | 7/2014 | Corrion | H04L 63/0838 713/155 |
| 2014/0222676 A1 | 8/2014 | Lee et al. | |
| 2014/0273965 A1 | 9/2014 | Raleigh et al. | |
| 2014/0380444 A1 | 12/2014 | Kelley | |
| 2015/0120549 A1 | 4/2015 | Khalid et al. | |
| 2015/0121496 A1 | 4/2015 | Caldeira De Andrada et al. | |
| 2015/0121501 A1 | 4/2015 | Khalid et al. | |
| 2015/0127939 A1 | 5/2015 | Mazandarany et al. | |
| 2015/0288661 A1 | 10/2015 | Monk et al. | |

* cited by examiner

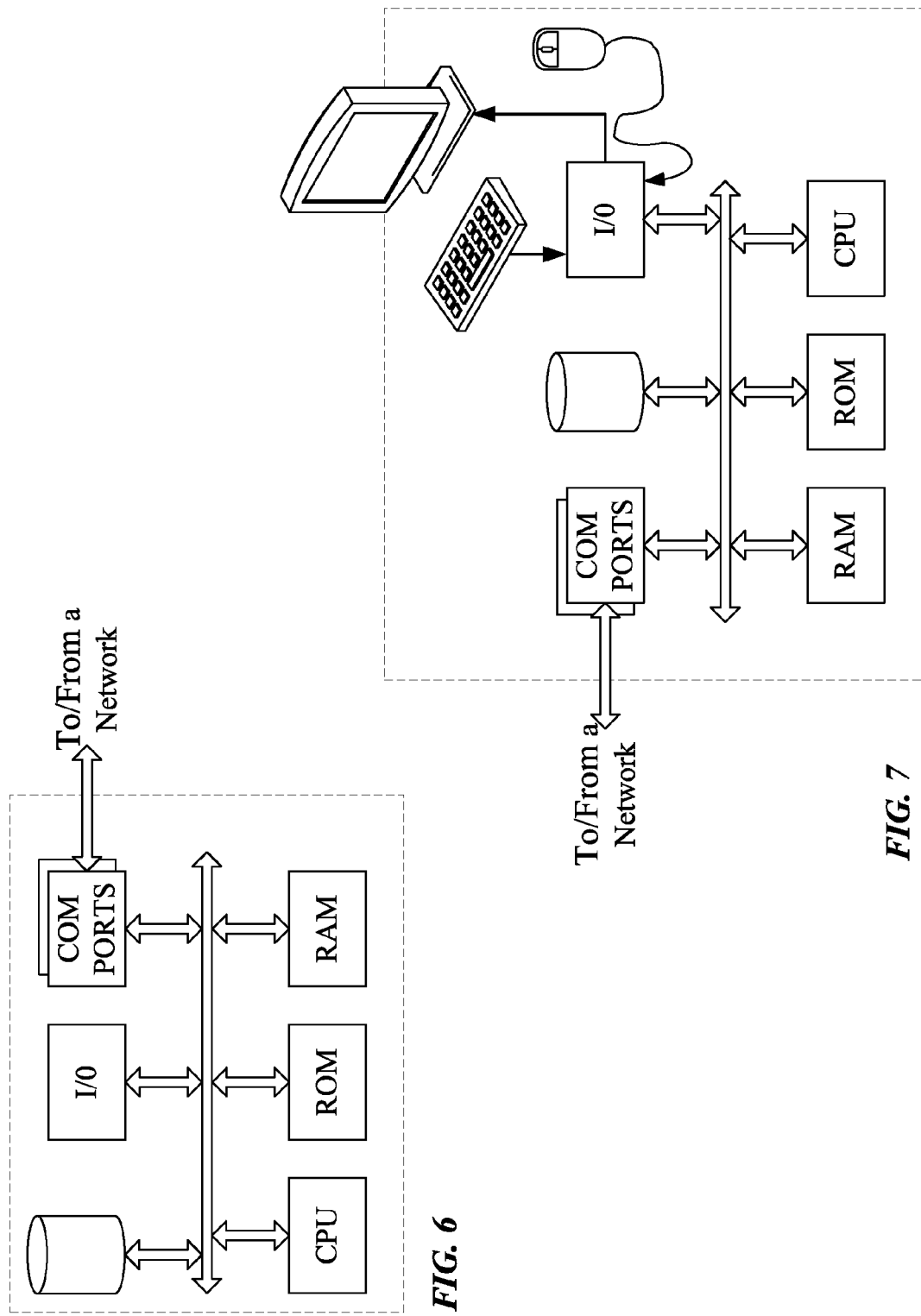

CONNECTED AUTHENTICATION DEVICE USING MOBILE SINGLE SIGN ON CREDENTIALS

CROSS-REFERENCE TO RELATED APPLICATIONS

This application is related to U.S. Pat. No. 9,628,482, issued on Apr. 18, 2017, concurrently filed herewith and titled "MOBILE BASED LOGIN VIA WIRELESS CREDENTIAL TRANSFER," U.S. Patent Application Publication No. 2015/0121482, published on Apr. 30, 2015, concurrently filed herewith and titled "MOBILE AUTHENTICATION FOR WEB PAYMENTS USING SINGLE SIGN ON CREDENTIALS," and U.S. Pat. No. 9,325,687, issued on Apr. 26, 2016, concurrently filed herewith and titled "REMOTE AUTHENTICATION USING MOBILE SINGLE SIGN ON CREDENTIALS." The entire content of the above-identified applications are incorporated herein by reference.

BACKGROUND

Users typically register to access many different online resources, for example, email service(s), banking service(s), brokerage service(s), utility service(s), social network(s), online store(s), video viewing service(s), newspapers(s), etc. In order to access an online resource, a user may need to provide login credentials for the online resource. Each online resource may have different login credentials associated therewith, regardless of whether or not the requirements for setting the login credentials are the same or different. Login credentials may be needed to provide security and to prevent unauthorized persons from accessing the online resources. For those online resources whose login credential requirements are the same, using the same (or even similar) login credentials can thus present an unacceptable security risk, while, on the other hand, remembering multiple different login credentials may be cumbersome for a user.

At the same time, a user oftentimes possesses a device (e.g., a mobile phone, a keychain, a wallet, etc.) which is usually on the user's person and is usually not shared with strangers. Possession of the device may be used to identify the user and to grant the user access to the online resource. However, a user may have difficulty proving possession of a device to an electronic interface that is not connected to the device. As the foregoing illustrates, a new approach for securely providing access to online resource(s) based on a device possessed by a user may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 6 is a simplified functional block diagram of a computer that may be configured to function as the backend server, the token server or the web server shown in FIG. 1; and FIG. 7 is a simplified functional block diagram of a personal computer or other work station or terminal device.

DETAILED DESCRIPTION

Figure 1:
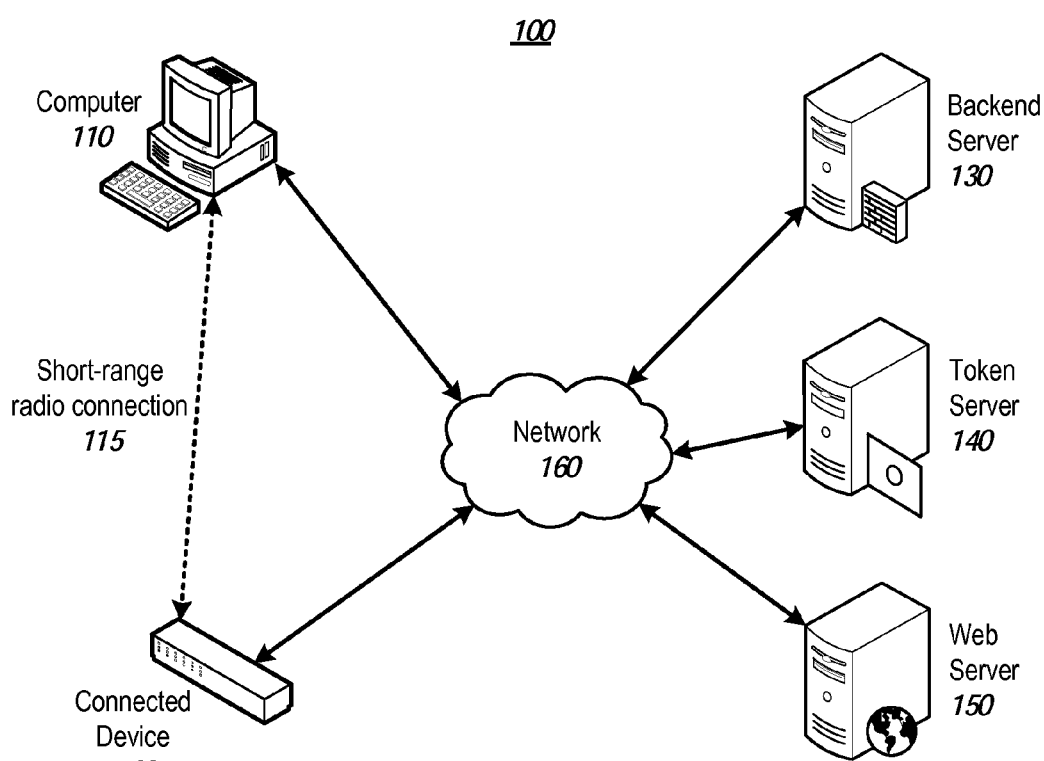
FIG. 1 illustrates an exemplary system for device-based authentication.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

As set forth above, users oftentimes create login credentials (e.g., usernames and passwords) for accessing multiple different web or application-based resources. Users may have difficulty remembering or accessing their login credentials, requiring a time-consuming resetting of the login credentials. However, a user typically carries a mobile device (e.g., a mobile phone) or a key ring, which may include an electronic connected device, for example, a key fob, which is oftentimes on the user's person and accessible to the user. The mobile device or the electronic connected device may be used as an authentication source, as the mobile device or the electronic connected device may be a trusted device with the user. One challenge with this approach is that a user may have difficulty proving possession of a device (e.g., a mobile phone or an electronic connected device) to an electronic interface (e.g., an interface of a browser on a laptop computer) that is not connected to the device.

In some aspects, the subject technology relates to an electronic connected device, for example, a key fob, that has a processor, a network interface, and a memory. In some cases, the electronic connected device may lack a screen or a keyboard. The network interface may include a subscriber identity module (SIM) for connecting to a cellular network. The memory stores tokens (e.g., usernames, passwords, certificates, etc.) for the user to access online resources at a computer different from the electronic connected device. To receive the tokens, a user may enter a website associated with a service provider of the electronic connected device that provides the SIM of the electronic connected device, an identifier of the electronic connected device and provide indicia of the token(s) to store at the electronic connected device (e.g., the username(s) and password(s) to associate with the token(s)). The identifier may be a mobile directory number (MDN) for a mobile phone or a manufacturer identifier. The tokens may then be provided to the electronic connected device.

When the user wishes to access an online resource at a computer using a token, the electronic connected device may transmit the token to the computer using a short-range radio (e.g., near field communication (NFC) or Bluetooth®) connection. Alternatively, the computer may be paired with the electronic connected device by identifying the geographic location of the computer, identifying the geographic location of the electronic connected device, and determining that the electronic connected device and the computer are closer to one another than a threshold distance (e.g., 5 meters or 15 meters). The threshold distance may correspond to a typical distance between a user's key chain and a computer at which the user is working. In some cases, the user may provide his/her home and office geographic locations, and the threshold distance may be different based on the geographic location of the connected device. For example, the threshold distance may be set to 50 feet at home, 10 feet at the office, and 5 feet elsewhere, as users typically keep their key chains further away from their persons at home and at the office than they do when they are out. Also, the fact that a user is at home or at the office may be used to authenticate the user, as he/she is more likely to be an authorized user if he/she is accessing the resource from home or the office. The device and the computer may determine their geographic locations based on one or more of a global positioning system (GPS) signal, a WiFi signal, a cellular signal, or an IP address, for example, using triangulation of GPS or cellular signals, a data repository (e.g., provided by Google® Corporation of Mountain View, Calif.) for converting WiFi signal(s) into geographic location(s), or a data repository for converting IP addresses into geographic locations.

Some implementations of the subject technology are described herein with reference to an electronic connected device. However, the subject technology may be implemented with any electronic device in place of the electronic connected device. For example, a mobile phone, a tablet computer, a digital music player, a personal digital assistant (PDA), a smart watch, etc. may take the place of the electronic connected device.

In some aspects, the electronic connected device receives, via a network interface of the device and from a backend server, a Single Sign OnSingle Sign On (SSO) PIN. As used herein, Single Sign On encompasses its plain and ordinary meaning including, but not limited to, is a property of access control of multiple related, but independent software systems. With the Single Sign On property a user logs in once and gains access to all systems without being prompted to log in again at each of them. The connected device transmits, via the network interface and to a token server, the Single Sign On PIN and credentials of a SIM of the connected device to request a token for accessing a network resource via a computer different from the device. The token is associated with a user account. The connected device receives, via the network interface of the device and from the token server, the token. The connected device stores the token at a local memory of the connected device. The connected device later receives a request for transmission of a token to a computer different from the device. The connected device in response to the request signals for transmission of the token to the computer upon verification that the computer is being accessed by a user associated with the user account. These steps are described in further detail below.

The connected device may be any electronic device including a processor, a network interface and a memory. In some cases, the connected device may also include a short-range radio or an accelerometer. For example, the connected device may be a mobile phone, a tablet computer, a personal digital assistant (PDA), a digital music player, or a key fob including a processor, a network interface, and a memory.

FIG. 1 illustrates an exemplary system 100 for device-based authentication. As shown, the system 100 includes a computer 110, a connected device 120, a backend server 130, a token server 140, and a web server 150 connected to one another via a network 160. The network 160 may include any network(s), for example, the Internet, an intranet, a virtual private network, a local area network, a wide area network, a wired network, a wireless network, etc.

While a single computer 110, connected device 120, backend server 130, token server 140, and web server 150 are illustrated, the subject technology may be implemented in conjunction with any number of computer(s), device(s), backend server(s), token server(s), and web server(s). In some examples, a single machine may implement the functionality of two or more of the backend server 130, the token server 140, and the web server 150.

The computer 110 may be any computing device that may access an online resource, via a web browser or an application. The online resource may request, from the computer 110, a token (e.g., a username, a password, or a certificate) for accessing the online resource. The computer 110 may be a desktop computer, a laptop computer, a tablet computer, a mobile phone, a digital music player, a personal digital assistant (PDA), a smart watch, etc. In some examples, the computer 110 may include a short-range radio (e.g., Bluetooth® or near field communication) connection for communicating with the connected device 120. Alternatively, the computer 110 may communicate with the connected device 120 over the network 160.

The connected device 120 may be any mobile device that runs a Single Sign On (SSO) client and can share tokens with the computer 110 over a short-range radio connection 115 such as, for example, Bluetooth or NFC. The tokens may be stored on the connected device 120 in a form such that the connected device 120 itself cannot use the tokens to access online resources. However, the computer 110 can use the tokens stored at the connected device 120 to access online resources. The connected device 120 may be an electronic key fob, a tablet computer, a mobile phone, a digital music player, a personal digital assistant (PDA), a smart watch, etc. In addition to the SSO client, the connected device 120 includes a processor, a network interface, and a memory and may or may not include a screen and/or a keyboard. The network interface of the connected device 120 may be a cellular network interface including a subscriber identity module (SIM) and may allow the connected device 120 to access the network 160. The memory of the connected device 120 is configured to store token(s) for accessing online resource(s) associated with the user. In some implementations, the connected device 120 is unique to the degree that it is remotely managed and maintained via Open Module Alliance Device Management (OMA-DM) and remote software control (e.g., to update, lock, or wipe the connected device 120). Similarly, an embedded global positioning system (GPS) receiver in the connected device 120 may add additional security and reporting capability (e.g., reporting geographic location, geoconferencing). The connected device 120 is described in more detail with respect to FIG. 2.

In some cases, the connected device 120 may not be present at the same geographic location (e.g., within 10 meters, 100 meters, etc.) as the computer 100 or the connected device 120 may not be connected to the network 160 or to the short-range radio connection 115. In such circumstances, the user may be requested to authenticate the access of the computer 110 to the online resource in another manner, for example, by manually entering his/her login credentials.

The backend server 130 may store Single Sign On PIN(s) for associating the connected device 120 with the user. The Single Sign On PIN may be created at the backend server in response to a request by the user to associate the connected device 120 with the user's account or in response to a request to update token(s) at the connected device 120. The connected device 120 may receive a Single Sign On PIN from the backend server 130 and use the received Single Sign On PIN to retrieve token(s) associated with the user from other server(s). The Single Sign On PIN may be associated with the user's account and the token(s) may be associated with the user's account, allowing the other server(s) to provide, to the connected device 120, the token(s) in response to receiving, from the connected device 120, the Single Sign On PIN. The backend server 130 may be associated with a telephone company that provided the SIM for the connected device 120.

The token server 140 stores token(s) associated with the user that represent credential(s) (e.g., username(s) and password(s)) of the user for accessing online resource(s). The token server 140 receives, from the connected device 120, the single-sign on PIN and credentials of the SIM of the device 120. The token server 140 provides, to the connected device 120, in response to authenticating, at the token server 140, the single-sign on PIN and the credentials of the SIM, token(s) associated with the user for storage at the connected device 120.

The web server 150 stores an online resource which may be accessed via a web browser or an application executing at the computer 110. To provide the online resource, the web server 150 requests login credentials from the computer 110. The web server 150 receives, from the computer 110, a token representing the login credentials (e.g., a username and a password) for accessing the online resource and provides the online resource to the computer 110 in response to receiving the token from the computer 110. For example, the web server 150 may be an online banking server of ABC Bank. The web server 150 may provide, to the computer 110, information about the user's accounts at ABC Bank in response to receiving, from the computer 110, the user's username and password for accessing ABC Bank's online banking service.

Figure 2:
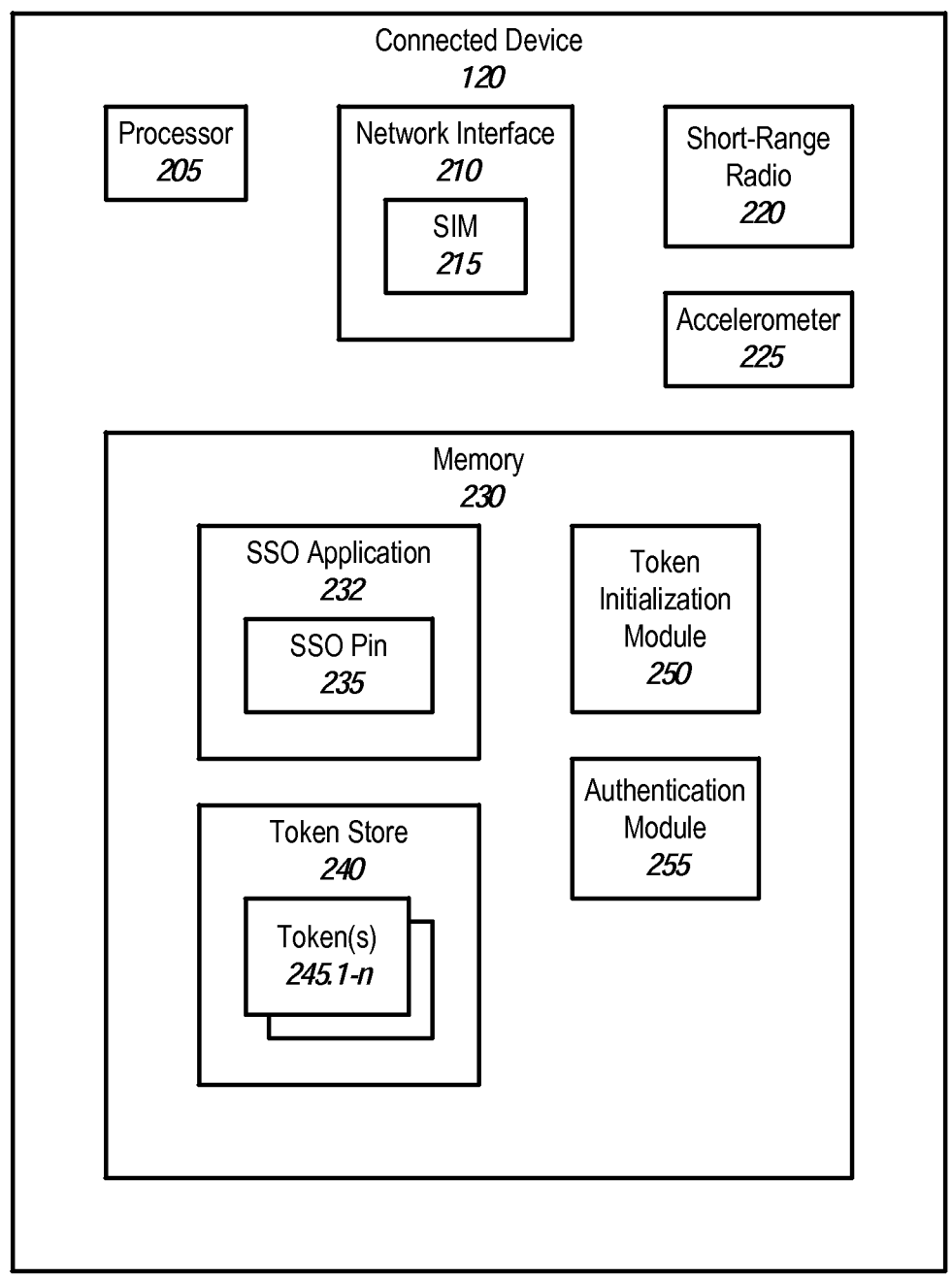
FIG. 2 illustrates an example of the device of FIG. 1.

FIG. 2 illustrates an example of the connected device 120 of FIG. 1. As shown, the connected device 120 includes a processor 205, a network interface 210, a short-range radio 220, an accelerometer 225, and a memory 230. The processor 205 executes programmed instructions, which may be stored in the memory 230. While a single processor 205 is illustrated, the device may have one or multiple processors. If there are multiple processors, the multiple processors may together carry out the functionality of the processor 205 described herein. The network interface 210 connects the connected device 120 to a network, for example, network 160. In some examples, the network interface 210 connects the connected device 120 to a cellular network and includes a SIM 215, which associates the connected device 120 with an account for connecting to the cellular network. The short-range radio 220 allows the connected device 120 to communicate with other machine(s) geographically proximate to the connected device 120, for example, within 20, 30, 50, or 100 meters of the connected device 120. The short-range radio 220 may be a near field communication (NFC) radio or a Bluetooth® radio. The accelerometer 225 measures an acceleration of the device and may be used to detect, for example, whether the device is being used to press a button. The memory 230 may include a cache unit, a storage unit, a long-term memory, or a short-term memory. As shown, the memory 230 stores a Single Sign On (SSO) application 232, a token store 240, a token initialization module 250, and an authentication module 255.

The SSO application 232 stores a Single Sign On (SSO) PIN 235. The SSO PIN 235 is received from the backend server 130 and serves to associate the connected device 120 with the user of the device. The SSO PIN 235 may be provided to the connected device 120, for example, in response to a user accessing a website and entering a serial number of the connected device 120, as well as information identifying the user, for example, the user's username and password or account number for accessing the user's telephony account associated with the SIM 215. To prevent against unauthorized use, the SSO PIN 235 may, in some cases, only be used once, and a new SSO PIN 235 may be required when/if the user wishes to update token(s) stored at the connected device 120.

The token store 240 stores token(s) 245.1-$n$ for accessing online resource(s) via the computer 110. The token store 240 may store one or multiple token(s) 245.1-$n$. The token(s) 245.1-$n$ may correspond to username(s), password(s), certificate(s), etc. for authenticating access to secure online resources. The token(s) 245.1-$n$ in the token store 240 may be received, at the connected device 120 and from the token server 140, in response to the connected device 120 providing, to the token server 140, the SSO PIN 235 from the SSO application 232 and credentials of the SIM 215. The credentials of the SIM 215 may include, for example, an identification number of the SIM 215 or a mobile directory number (MDN) of the SIM 215. The credentials of the SIM 215 may be validated based on information representing valid SIM credentials stored at the token server 140 or information representing valid SIM credentials stored at a server of a telephone company and received, at the token server 140, from the server of the telephone company.

The token initialization module 250 stores instructions which may be executed by the processor 205 to retrieve tokens from the token server 140. When executing the token initialization module 250, the processor 205 receives, via the network interface 210 and from the backend server 130, the SSO PIN 235 for storing in the SSO application 232. The user may insert the SIM 215 into the connected device 120. The connected device 120 may connect to a network using the SIM 215 and request the SSO PIN 235 from the backend server 130 in order to receive the SSO PIN 235. The processor 205 transmits, via the network interface 210 and to the token server 140, the SSO PIN 235 and credentials of the SIM 215 to request token(s) 245.1-$n$ associated with a user account corresponding to the SSO PIN 235 from the token server 140. The token(s) 245.1-$n$ may be associated with the user account when the user registers his/her connected device 120 and requests for login credential(s) of online resource(s) to be stored at the connected device 120. The registration may be completed via a website of the telephone company for logging into the user's account with the telephone company and inputting the login credential(s) of the online resource(s) to be stored at the connected device 120. The processor 205 receives the token(s) 245.1-$n$ via the network interface 210 and from the token server 140. The processor 205 stores the token(s) 245.1-$n$ at the connected device 120, for example, in the token store 240 of the memory 230 of the connected device 120.

The authentication module 255 stores instructions which may be executed by the processor 205. When executing the authentication module 255, the processor 205 receives a request for transmission of a token 245.$k$ (where $k$ is a number between 1 and $n$) to the computer 110, which is than the connected device 120 in which the processor 205 is disposed. The processor 205 signals for transmission of the token 245.$k$ to the computer 110 upon verification that the computer 110 is being accessed by the user of the device 110 who is associated with the user account.

In some cases, the token 245.$k$ is transmitted to the computer 110 via the short-range radio 220. In these cases, the user is verified to be associated with the user account based on the proximity of the connected device 120 to the computer 110, as the computer 110 may be within the transmission range of the short-range radio 220 (e.g., 30 meters or 100 meters) away from the connected device 120 and coupled, via the short-range radio 220, with the connected device 120. Alternatively, the token 245.$k$ may be transmitted from the connected device 120 to the computer 110 over the network 160 via the backend server 130. To verify that the computer 110 is being accessed by the user of the connected device 120 associated with the user account, the backend server 130 may receive, from the connected device 120 and from the computer 110, the geographic locations of the device 120 and the computer 110, and verify that the connected device 120 and the computer 110 are within a threshold distance (e.g., 10 meters or 20 meters) away from one another. If the verification is successful, the computer 110 is provided the online resource based on the token of the connected device 120. If the verification fails, an error message may be presented at the computer 110 or the connected device 120. The user may be requested to access the online resource using a different technique (e.g., manual entry of login credentials) or reattempt authentication via the connected device 120.

According to some examples, time and/or geographic limitations may be placed on when the connected device 120 can be used to connect a computer to an online resource. For example, the backend server may verify that the connected device 120 is geographically proximate (e.g., within 100 meters of one another or in the same city) to the computer, that the connected device 120 and the computer are located within the United States, or that the connected device and the computer are being used between 7 AM and 11 PM local time. For example, it is unlikely that an American who lives and works in New York City will be accessing an online resource using the connected device 120 at 3 AM local time from a computer in Moscow, Russia. The connected device 120 may periodically transmit its geographic location, as determined by a global positioning system (GPS) receiver within the connected device 120, to the backend server. The geographic location may be determined and transmitted in response to a notification, from the backend server, that a computer is attempting to access an online resource. Alternatively, the geographic location may be determined and transmitted once every threshold time period (e.g., once every three minutes). The threshold time period may be constant (e.g., always three minutes) or variable depending on whether an accelerometer of the connected device 120 indicates that the connected device 120 is moving or stationary (e.g., once every one minute when moving and once every five minutes when stationary).

According to some examples, the connected device 120 illustrated in FIG. 2 is a key fob lacking a screen and lacking a connection for a screen. The key fob may include the processor 205, the network interface 210, the short-range radio 220, the accelerometer 225, and the memory 230, as illustrated in FIG. 2. Alternatively, the connected device 120 may include a screen or a connection for a screen. For example, the connected device 120 may be a mobile phone, a digital music player, a personal digital assistant (PDA), or a smart watch with a screen.

Figure 3:
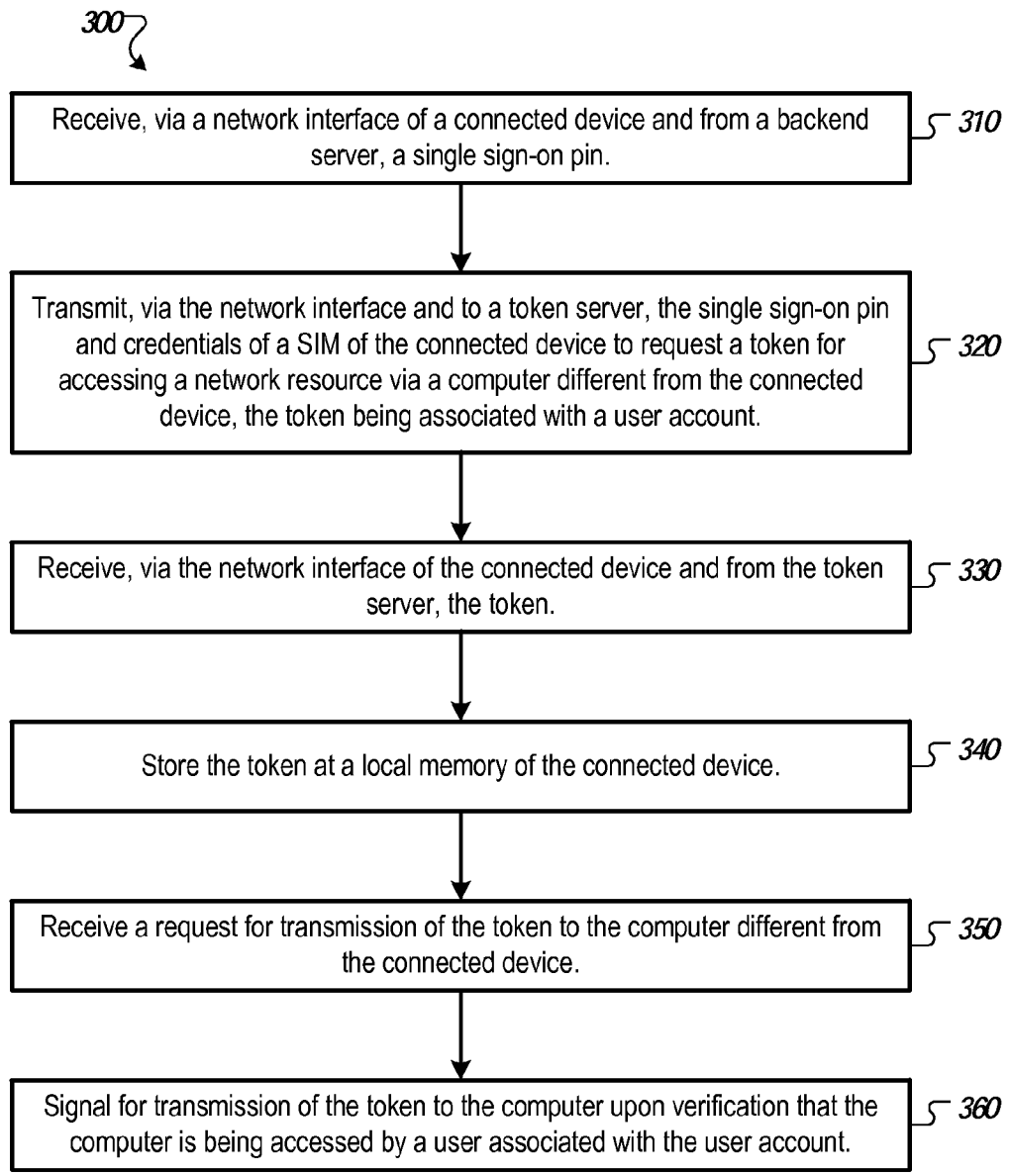
FIG. 3 illustrates an exemplary process for device-based authentication.

FIG. 3 illustrates an exemplary process 300 for device-based authentication. The process 300 begins at step 310, where a device (e.g., connected device 120) receives, via a network interface (e.g., network interface 210) of the device and from a backend server (e.g., backend server 130) a Single Sign On PIN (e.g., SSO PIN 235). The Single Sign On PIN may be used to associate the device with an account of a user. The Single Sign On PIN may be provided to the device in response to a user providing to the backend server instructions to associate a SIM (e.g., SIM 215) of the device with the account of the user. The instructions may be provided to the backend server, for example, via a webpage for accessing a telephony account associated with the SIM.

In step 320, the device transmits, via the network interface and to a token server (e.g., token server 140), the Single Sign On PIN and credentials of the SIM of the device to request a token (e.g., token 245.$k$) for accessing a network resource (e.g., a website or application accessing information stored at web server 150) via a computer (e.g., computer 110) that is different from the device. The token is associated with a user account. For example, the token may include a username and a password for accessing an account at a social networking service.

In step 330, the device receives, via the network interface of the device and from the token server, the token. The device may be connected to a cellular network. The token may be transmitted to the device via a short messaging service (SMS) protocol, a multimedia messaging service (MMS) protocol, or via a cellular data transmission protocol, for example, Wireless Application Protocol (WAP), Enhanced Data Rates for GSM Evolution (EDGE), 3G, or 4G Long Term Evolution (LTE). Alternatively, if the device is connected to a WiFi network, the token may be transmitted over WiFi.

In step 340, the device stores the token in at a local memory (e.g., memory 230) of the device. The memory may include a specialized token store (e.g., token store 240) for storing token(s) (e.g., token(s) 245.1-$n$) associated with the user. Alternatively, the memory may have any other structure.

In step 350, the device receives a request for transmission of the token to the computer. The request may be made using any known technique. In one example, a button may be pressed on the device to make the request and a button may be pressed or a command may be entered at the computer to have the computer receive the token. Alternatively, the request for transmission of the token to the device may include accelerating the device at an acceleration corresponding to pressing or hitting a button (e.g., a space bar) on the computer with the device. The acceleration of the device may be measured or detected by an accelerometer (e.g., accelerometer 225). The computer may make a request to receive the token from the device by having the button pressed on the computer. The request may be transmitted to the backend server for transmission of the token from the device to the computer via the network and the backend server. Alternatively, in response to the request, a short-range radio (e.g., short-range radio 220, which may be a NFC radio or a Bluetooth® radio) may be activated at the device and a short-range radio may be activated at the computer. The token may be transmitted from the device to the computer via the short-range radio. In some examples, the pairing of the device and the computer may be based on multiple factors or parameters, for example, time, geographic location, audio recording(s) at the time of contact, short-range radio (e.g., Bluetooth® or WiFi) information, etc. Other factors or parameters, in addition to those listed above, may be used.

In some examples, the backend server may verify the geographic location information of the device and the computer to ensure that the device and the computer are proximate (e.g., within 10 meters, 20 meters, etc.) of one another. The backend server may receive the device's geographic location from the device and the computer's geographic location from the computer. The device and the computer may determine their geographic locations based on one or more of a global positioning system (GPS) signal, a WiFi signal, a cellular signal, or an IP address, for example, using triangulation of GPS or cellular signals, assisted GPS, a data repository (e.g., provided by Google® Corporation of Mountain View, Calif.) for converting WiFi signal(s) into geographic location(s), or a data repository for converting IP addresses into geographic locations. If assisted GPS is used, the time for processing the connection request may be increased, due to the slower speed of assisted GPS technology.

In step 360, in response to receiving the request for transmission of the token to the computer, the device signals for transmission of the token to the computer upon verification that the computer is being accessed by a user of the user account. The verification may be made based on the proximity of the computer and the device, as discussed above. The transmission of the token may be completed via the network or via a short-range radio connection between the device and the computer. Upon receiving the token from the device, the computer may use the token to access an online resource residing at a web server (e.g., web server 150). The online resource may be accessed via a web browser or via a special-purpose application. For example, an online brokerage account may be accessed via the brokerage's webpage or via a mobile phone or tablet computer application for the brokerage. After step 360, the process 300 ends.

Figure 4:
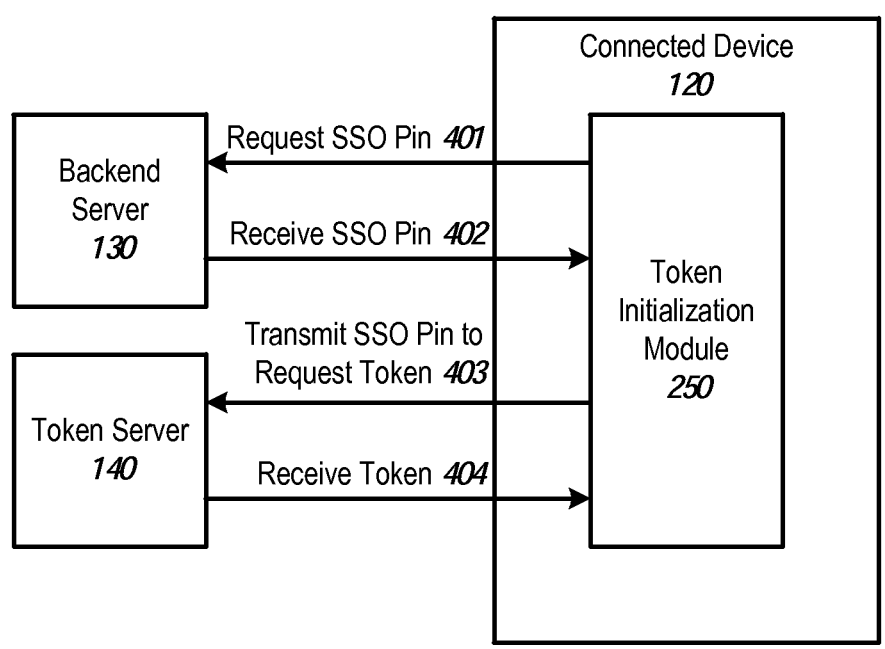
FIG. 4 illustrates an exemplary data transmission for device-based authentication.

FIG. 4 illustrates an exemplary data transmission for device-based authentication. The steps 401-404 are described from the point of view of the token initialization module 250 of the connected device 120. In step 401, the token initialization module 250 requests the SSO PIN (e.g., SSO PIN 235) from the backend server 130. In step 402, the token initialization module 250 receives the SSO PIN from the backend server 130. In step 403, in response to receiving the SSO PIN, the token initialization module transmits the SSO PIN to the token server 140 in order to request the token from the token server. The SSO PIN may be transmitted in conjunction with credentials of the SIM (e.g., SIM 215) of the connected device 120. In step 404, in response to the request for the token, including transmitted SSO PIN, the token initialization module 250 receives, from the token server 140, the token (e.g., token 245.k).

Figure 5:
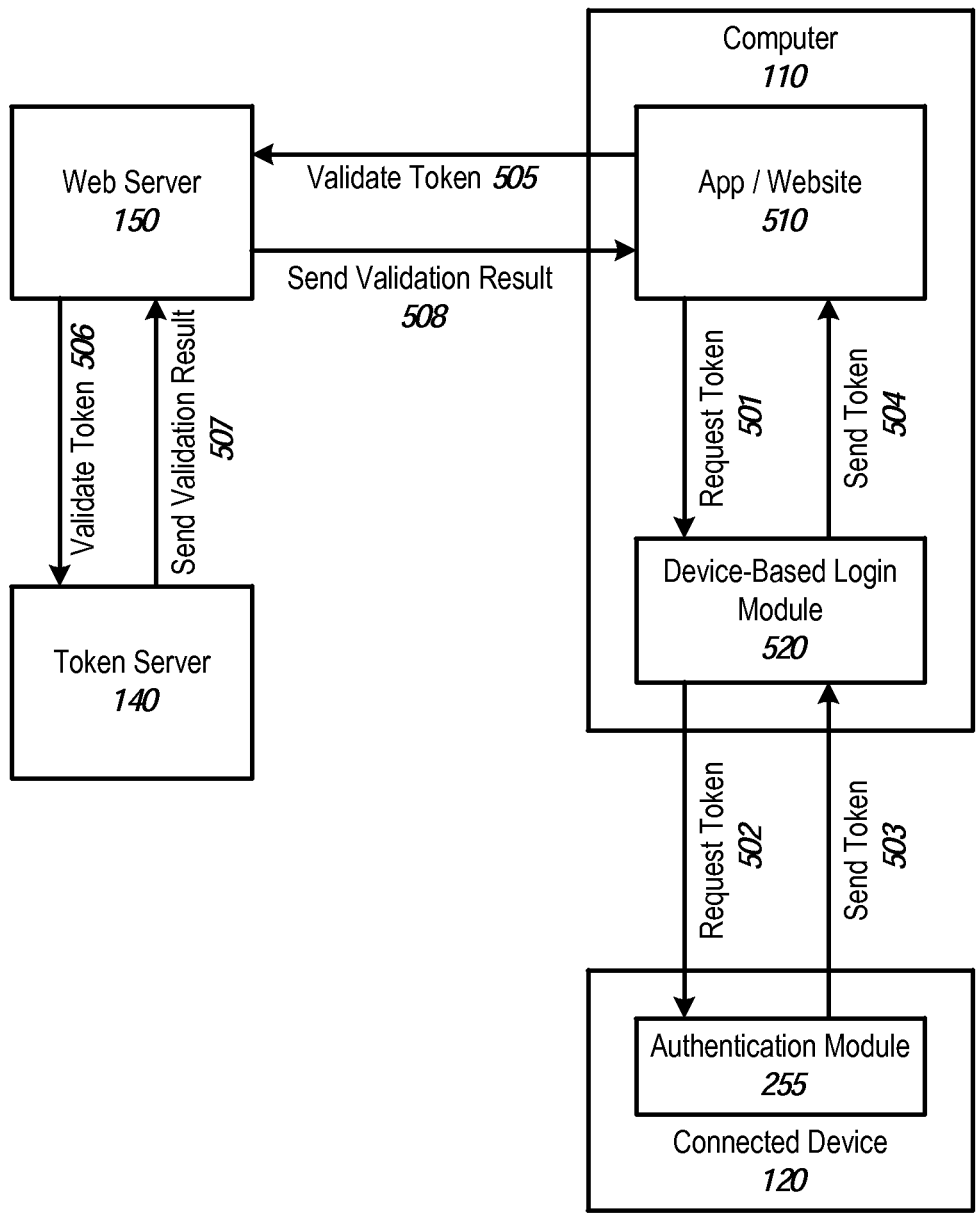
FIG. 5 illustrates another exemplary data transmission for device-based authentication.

FIG. 5 illustrates another exemplary data transmission for device-based authentication. As shown in FIG. 5, data is transmitted between the computer 110, the connected device 120, the token server, and the web server 150. The computer 110 includes an application (app) or website 510 and a device-based login module. The app/website 510 may be presented within a mobile phone application, a tablet computer application, or a browser. The app/website 510 accesses an online resource and to present (e.g., display) the online resource via the computer 110. The online resource may reside at the web server 150. The device-based login module 520 receives a token (e.g., token 245.k) for accessing the online resource from the connected device 120 and provides the token to the app/website 510.

In step 501, the app/website 510 requests a token from the device-based login module 520. For example, while viewing the app/website 510, the user may press a button (e.g., a space bar) on the computer 110 to indicate that the app/website 510 is to be authenticated based on a token received from the connected device 120.

In step 502, the device-based login module 520 requests the token from the authentication module 255 of the connected device 120. The computer 110 may communicate with the device directly over a short-range radio connection or via a server (e.g., backend server 130) and a network connection. In step 503, the authentication module 255 sends the token to the device-based login module 520 in response to the request for the token of step 502. Upon receiving the token, in step 504, the device-based login module 520 sends the token to the app/web site 510.

In step 505, the app/website 510 wends the token to the web server 150, which validates the token by forwarding the token to the token server 140 in step 506. The token server 140 generates a validation result (e.g., Valid or Invalid, where Valid may be represented as TRUE and Invalid may be represented as FALSE, or vice versa). In step 507, the token server 140 sends the validation result to the web server 150. In step 508, the web server 150 sends the validation result to the app/website 510. If the validation result is Valid, the app/website 510 may be granted access to the online resource at the web server 150. If the validation result is Invalid, the app/website 510, the app/website 510 may not be granted access to the online resource at the web server 150, and an error message may be presented at the app/website 510. The error message may state that the token is invalid and request that the user enter the token via another technique, for example, manual entry into an input box.

The subject technology provides, among other things, techniques for a secure web-based or mobile application-based service. A user may have a device that stores his/her tokens (e.g., username(s), password(s), certificate(s), etc.) for accessing web-based or mobile-application based services. The device may be any device that includes processor(s), a network interface, and a memory. In some cases, the device may also include an accelerometer or a short-range radio (e.g., a NFC radio or a Bluetooth® radio). For example, the device may be a key fob attached to a key ring of the user that does not include a screen. Alternatively, the device may be any mobile electronic device, for example, a mobile phone, a tablet computer, a personal digital assistant (PDA), a digital music player, etc.

The memory of the device includes a token initialization module. The token initialization module receive(s) token(s) from a token server and stores the token(s) locally in the memory of the device. The device may periodically (e.g., once per day, once per week, or responsive to a user request) update the tokens stored thereon, for example, if the user changes his/her password. In some examples, the device includes a network interface for accessing a cellular network via a subscriber identity module (SIM), and the token(s) are transmitted to the device through the cellular network, for example, via the short messaging service (SMS) protocol.

The memory of the device also includes an authentication module. The authentication module transmits the token(s) to a computer in response to a request, from the user, to allow the computer to access a web-based or mobile application-based service associated with a token. The request may be made, for example, by accelerating the device at an acceleration, measured by the accelerometer of the device, corresponding to hitting a button, or by pressing a button on the device. The token may be transmitted from the device to the computer via a network connection (e.g., via the Internet or a cellular network) or via a short-range radio connection.

As shown by the above discussion, functions relating to the an enhanced user experience for the service of accessing a secure online resource, via a graphical user interface of a mobile station may be implemented on computers connected for data communication via the components of a packet data network, operating as a computer 110 and/or as a connected device 120 as shown in FIG. 1. Although special purpose devices may be used, such devices also may be implemented using one or more hardware platforms intended to represent a general class of data processing device commonly used to run "server" programming so as to implement the accessing a secure online resource functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the token initialization module 250 or the authentication module 255. The software code is executable by the general-purpose computer that functions as the computer 110, the connected device 120, the backend server 130, the token server 140, or the web server 150. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for accessing a secure online resource, in essentially the manner performed in the implementations discussed and illustrated herein.

FIGS. 6 and 7 provide functional block diagram illustrations of general purpose computer hardware platforms. FIG. 6 illustrates a network or host computer platform, as may typically be used to implement a server. FIG. 7 depicts a computer with user interface elements, as may be used to implement a personal computer or other type of work station or terminal device, although the computer of FIG. 7 may also act as a server if appropriately programmed. It is believed that the general structure and general operation of such equipment as shown in FIGS. 6 and 7 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 7). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, examples of the methods of accessing a secure online resource outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the token initialization module 250, the authentication module 255, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a Blu-ray disc read-only memory (BD-ROM), CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

These general and specific aspects may be implemented using a system, a method, a computer program, a computer readable medium, or an apparatus or any combination of systems, methods, computer programs, computer readable mediums, and/or apparatuses While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device configured to enable access by a computer to a secure online resource, the device comprising:
   a processor;
   a network interface including a subscriber identity module (SIM) for connecting to a cellular network; and
   a memory storing executable instructions for causing the processor to:
      request, via the network interface and from a backend server, a Single Sign On PIN;
      receive, in response to the request, the Single Sign On PIN from the backend server;
      transmit, via the network interface and to a token server, the Single Sign On PIN and credentials of the SIM to request a token for accessing the secure online resource via the computer, the computer being different from the device, wherein the token is associated with a user account;
      receive, via the network interface and from the token server, the token;
      store the token at the device to enable the access by the computer to the secure online resource, wherein the device is unable to use the token to enable the device to access the secure online resource;
      receive from the computer, after the storing of the token, a request for transmission of the token to the computer responsive to a request from the computer for access to the secure online resource;
      responsive to the receiving of the request from the computer, verify, without manual authentication, that the computer is being accessed by a user associated with the user account based on the device being geographically proximate to the computer; and
      transmit the token to the computer upon the verification that the computer is being accessed by the user associated with the user account.

2. The device of claim 1, wherein the instructions for causing the processor to verify that the computer is being accessed by the user associated with the user account comprise instructions to: determine, based on a geographic location of the computer and a geographic location of the device, that a geographic distance between the computer and the device is less than a geographic distance threshold.

3. The device of claim 1, wherein the instructions for causing the processor to verify that the computer is being accessed by the user associated with the user account comprise instructions to: determine that the computer is coupled with the device via a short-range radio connection established by a short-range radio interface between the device and the computer.

4. The device of claim 3, wherein the memory further stores executable instructions for causing the processor to receive from the computer the request for transmission of the token and transmit the token to the computer via the short-range radio connection.

5. The device of claim 1, wherein the token is transmitted to the computer via the network interface and via a proxy server.

6. The device of claim 1, wherein the token for accessing the secure online resource comprises one or more of a username, a password, or a certificate.

7. The device of claim 1, wherein the instructions for causing the processor to store the token comprise instructions to store the token in a form such that the device itself cannot use the stored token to access the secure online resource.

8. The device of claim 1, wherein the instructions to verify that the computer is being accessed by a user associated with the user account cause the processor to transmit the token to the computer upon verification by the backend server that a local time for a geographic location of the computer is within a time limitation placed on when the device is allowed to be used to connect the computer to the secure online resource.

9. A method to enable access by a computer to a secure online resource, the method comprising:
requesting, via a network interface of a device and from a backend server, a Single Sign On PIN;
receiving, at the device, in response to the request, the Single Sign On PIN from the backend server;
transmitting, via the network interface and to a token server, the Single Sign On PIN and credentials of a subscriber identity module (SIM) of the device to request a token for accessing the secure online resource via the computer, wherein the token is associated with a user account and the SIM is for connecting to a cellular network;
receiving, via the network interface and from the token server, the token; and
storing the token at the device to enable the access by the computer to the secure online resource;
receiving from the computer, after the storing of the token, a request for transmission of the token to the computer responsive to a request from the computer for access to the secure online resource;
responsive to the receiving of the request from the computer, verifying that the computer is being accessed by a user associated with the user account, wherein the verifying that the computer is being accessed by the user associated with the user account comprises verifying that a local time for a geographic location of the computer is within a time limitation placed on when the device is allowed to be used to connect the computer to the secure online resource; and
transmitting the token to the computer upon the verification that the computer is being accessed by the user associated with the user account,
wherein:
the computer is different from the device,
the verifying that the computer is being accessed by the user associated with the user account is further based on the device being geographically proximate to the computer and further comprises:
determining, based on the geographic location of the computer and a geographic location of the device, that a geographic distance between the computer and the device is less than a geographic distance threshold, and the method further comprises setting the geographic distance threshold based on the geographic location of the device.

10. The method of claim 9, wherein the verifying that the computer is being accessed by the user associated with the user account further comprises: determining that the computer is coupled with the device via a short-range radio connection established by a short-range radio interface between the device and the computer.

11. The method of claim 10, further comprising receiving from the computer the request for transmission of the token and transmitting the token to the computer via the short-range radio connection.

12. The method of claim 9, wherein the token is transmitted to the computer via the network interface and via a proxy server.

13. The method of claim 9, wherein the verifying that the computer is being accessed by the user associated with the user account is performed without manual authentication at the device.

14. The method of claim 9, wherein the device is unable to use the token to enable the device to access the secure online resource.

15. A method to enable access by a computer to a secure online resource, the method comprising:
requesting, via a network interface of a device and from a backend server, a Single Sign On PIN;
receiving, at the device, in response to the request, the Single Sign On PIN from the backend server;
transmitting, via the network interface and to a token server, the Single Sign On PIN and credentials of a subscriber identity module (SIM) of the device to request a token for accessing the secure online resource via the computer, wherein the token is associated with a user account and the SIM is for connecting to a cellular network;
receiving, via the network interface and from the token server, the token;
storing the token at the device to enable the access by the computer to the secure online resource;
receive from the computer, after the storing of the token, a request for transmission of the token to the computer responsive to a request from the computer for access to the secure online resource;
responsive to the receiving of the request from the computer, verify, without manual authentication, that the computer is being accessed by a user associated with the user account based on the device being geographically proximate to the computer; and
transmit the token to the computer upon the verification that the computer is being accessed by the user associated with the user account,
wherein the device is unable to use the token to enable the device to access the secure online resource, and
wherein the computer is different from the device.

16. The method of claim 15, wherein the verifying that the computer is being accessed by the user associated with the user account comprises verifying that a local time for a geographic location of the computer is within a time limitation placed on when the device is allowed to be used to connect the computer to the secure online resource.

17. The method of claim 15, wherein the verifying that the computer is being accessed by the user associated with the user account is further based on the device being geographically proximate to the computer and further comprises: determining, based on the geographic location of the computer and a geographic location of the device, that a geographic distance between the computer and the device is less than a geographic distance threshold.

18. The method of claim 17, further comprising setting the geographic distance threshold based on the geographic location of the device.

* * * * *